United States Patent
Barker et al.

(10) Patent No.: US 6,918,786 B2
(45) Date of Patent: Jul. 19, 2005

(54) ANGLED PATCH PANEL WITH CABLE SUPPORT BAR FOR NETWORK CABLE RACKS

(75) Inventors: Jed M. Barker, Orland Park, IL (US); Mark J. Donnell, Orland Park, IL (US); Kevin E. Honan, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/941,472

(22) Filed: Sep. 15, 2004

(65) Prior Publication Data

US 2005/0041947 A1 Feb. 24, 2005

Related U.S. Application Data

(63) Continuation of application No. 09/916,923, filed on Jul. 26, 2001, now Pat. No. 6,866,541.

(51) Int. Cl.⁷ .............................................. H01R 13/60
(52) U.S. Cl. .................................................. 439/540.1
(58) Field of Search .............................. 439/540.1, 532, 439/536, 134, 135–137, 48, 716, 501, 557–558; 385/134–139; 211/26; 361/826, 825, 600, 695

(56) References Cited

U.S. PATENT DOCUMENTS

| | | | |
|---|---|---|---|
| 2,427,349 A | 9/1947 | Boynton | |
| 4,747,020 A | 5/1988 | Brickley et al. | |
| 5,011,257 A | 4/1991 | Wettengel et al. | |
| 5,127,082 A | 6/1992 | Below et al. | |
| 5,129,842 A | * 7/1992 | Morgan et al. | 439/532 |
| 5,303,519 A | 4/1994 | Mustee et al. | |
| RE34,955 E | 5/1995 | Anton et al. | |
| 5,645,449 A | 7/1997 | Sabo | |
| 5,676,566 A | 10/1997 | Carlson, Jr. et al. | |
| 5,734,776 A | 3/1998 | Puetz | |
| 5,735,714 A | 4/1998 | Orlando et al. | |
| 5,788,087 A | * 8/1998 | Orlando | 211/26 |
| 5,836,786 A | 11/1998 | Pepe | |
| 5,921,402 A | 7/1999 | Magenheimer | |
| 5,944,535 A | 8/1999 | Bullivant et al. | |
| 5,945,633 A | 8/1999 | Ott et al. | |
| 5,947,765 A | 9/1999 | Carlson, Jr. et al. | |
| 5,956,449 A | 9/1999 | Otani et al. | |
| 5,984,720 A | 11/1999 | Milner et al. | |
| 6,146,192 A | 11/2000 | Cabalka et al. | |
| 6,208,796 B1 | 3/2001 | Vigliaturo | |
| 6,231,380 B1 | 5/2001 | Cabalka et al. | |
| 6,236,795 B1 | 5/2001 | Rodgers | |
| 6,240,234 B1 | 5/2001 | Falkenberg et al. | |
| 6,242,698 B1 | 6/2001 | Baker, III et al. | |
| 6,350,148 B1 | 2/2002 | Bartolutti et al. | |
| 6,468,112 B1 | 10/2002 | Follingstad et al. | |
| 6,497,578 B1 | 12/2002 | Kwong et al. | |
| 6,537,106 B1 | 3/2003 | Follingstad | |
| 6,600,106 B2 | 7/2003 | Standish et al. | |
| 6,614,978 B1 | 9/2003 | Caveney | |
| 2003/0129871 A1 | 7/2003 | Follingstad | |

* cited by examiner

Primary Examiner—Ross Gushi
Assistant Examiner—Phuongchi Nguyen
(74) Attorney, Agent, or Firm—Robert A. McCann; Christopher S. Clancy (57) ABSTRACT

A patch panel mountable to a network rack includes a patch panel frame and rack mounting plates. The frame forms a central section having a longitudinal width sized to fit within the network. The rack mounting plates are provided on opposite longitudinal ends of the central section and allow the panel to be mounted to a network rack. The central section includes two panel sections angled outwardly in an inverted V-Shape, and the central section has mounted thereon a plurality of cable connectors that receive cabling on the front side and the rear side of the patch panel frame. Each connector has a horizontal axis.

5 Claims, 8 Drawing Sheets

ANGLED PATCH PANEL WITH CABLE SUPPORT BAR FOR NETWORK CABLE RACKS

CROSS-REFERENCES TO RELATED APPLICATIONS

This application is a continuation of application Ser. No. 09/916,923, filed Jul. 26, 2001 now U.S. Pat. No. 6,866,541.

BACKGROUND OF THE INVENTION

1. Field of Invention

Generally, the present invention relates to cable management devices for network equipment racks. In particular, the invention relates to an angled patch panel and cable support bar therefor.

2. Description of Related Art

Cables, such as UTP, ScTP, coaxial and fiber optic cables, transmit data, voice, video and/or audio information in the telecommunications industry. Patch panel and network equipment enclosure and rack systems are well-known in the industry. They manage and organize such cables both to and from such equipment and/or to and from such natch panels. These systems usually include the standard EIA 19", 23" or other distribution frame rack on which one or more patch panels, network equipment, fiber optic enclosures and the like are mounted. Rack enclosures serve various functions, including their use as slack trays, splice trays, cable organizers and patch panels. These rack enclosures also serve as interconnect or cross-connect enclosures when they interface with equipment. Additionally, rack systems may serve as a telecommunications closet, allowing the cables to be terminated, spliced, patched and/or stored at various places along their length.

The rack is usually from a frame having mounting apertures located along the vertical legs or walls of the rack. Patching equipment, such as a patch panel, is mounted onto the rack so as to generally define a patching side, where patch cords from another active device or another patch panel can be cross-connected and interconnected, and distribution side, where cables from network equipment and/or work station areas are terminated. Generally, some form of cable management is provided on both sides of the rack to support and route the cables. While preventing detrimental bending is always important even for copper cabling, with the increasing use of fiber connectors as applied to connector rack systems, proper cable management and bend radius control has become increasingly important. Many known systems are unable to provide complete bend radius control, are inefficient, are difficult to manufacture, are difficult to manage and access, and/or have other drawbacks. Thus, improvement in the cable management of network rack systems is desired. In particular, many patch panel systems require both horizontal and vertical cable management within the rack.

There is a need for a patch panel design that eliminates the necessities for one or more of these cable management devices.

There is also a need for a patch panel system that can accomodate more port capacity and provide additional space for containing cabling.

SUMMARY OF THE INVENTION

It is an object of the invention to provide and improved patch panel for a network rack that can provide better cable management without the need for a horizontal cable manager.

It is another object of the invention to provide an improved patch panel that can accommodate greater port capacity.

It is another other object of the invention to provide cable support to a patch panel.

Various one of the above and other objects are achieved by a patch panel mountable to a network rack comprising a frame and rack mounting plates. The frame forms a central section having a longitudinal width sized to fit within the network rack, a predefined height, a front side, and a rear side. The rack mounting plates are provided on opposite longitudinal ends of the central section and allow the panel to be mounted to a network rack. The central section is angled outwardly in an inverted V-shape. The central section has mountable thereon a plurality of cable connectors that receive cabling on the front side and the rear side of the patch panel frame. When mounted, the plurality of cable connectors are oriented to have rear surfaces thereof face a common axis of the central section.

Various one of the above and other objects are also achieved by a network rack and patch panel assembly, comprising: a network rack having two rails spaced a predetermined distance from each other, each rail including spaced mounting openings; and a patch panel mounted to the network rack. The patch panel includes a frame forming a central section and having a longitudinal width sized to fit between the two rails, a predefined height, a front side, and a rear side. The patch panel also includes rack mounting plates provided on opposite longitudinal ends of the central section connected to ones of the spaced mounting openings of the rails. The central section is angled outwardly in and inverted V-shaped. Mounted on the central section are a plurality of cable connectors that receive cabling on the front side and the rear side of the patch panel frame. The plurality of cable connectors are oriented to have rear surfaces thereof face a common axis of the central section.

The patch panel and rack may further include a cable support bar that supports the weight of cabling exiting the rear of the patch panel.

BRIEF DESCRIPTION OF THE DRAWINGS

The foregoing and further objects, features and advantages of the present invention will become apparent from the following description of preferred embodiments with references to the accompanying drawings, wherein.

DETAILED DESCRIPTION OF PREFERRED EMBODIMENTS

A patch panel 100 according to an exemplary first embodiment of the invention is generally shown in FIGS. 1–6 and is useful in providing a support panel for mounting reconfigurable ports for patching components in a network rack.

Figure 1:
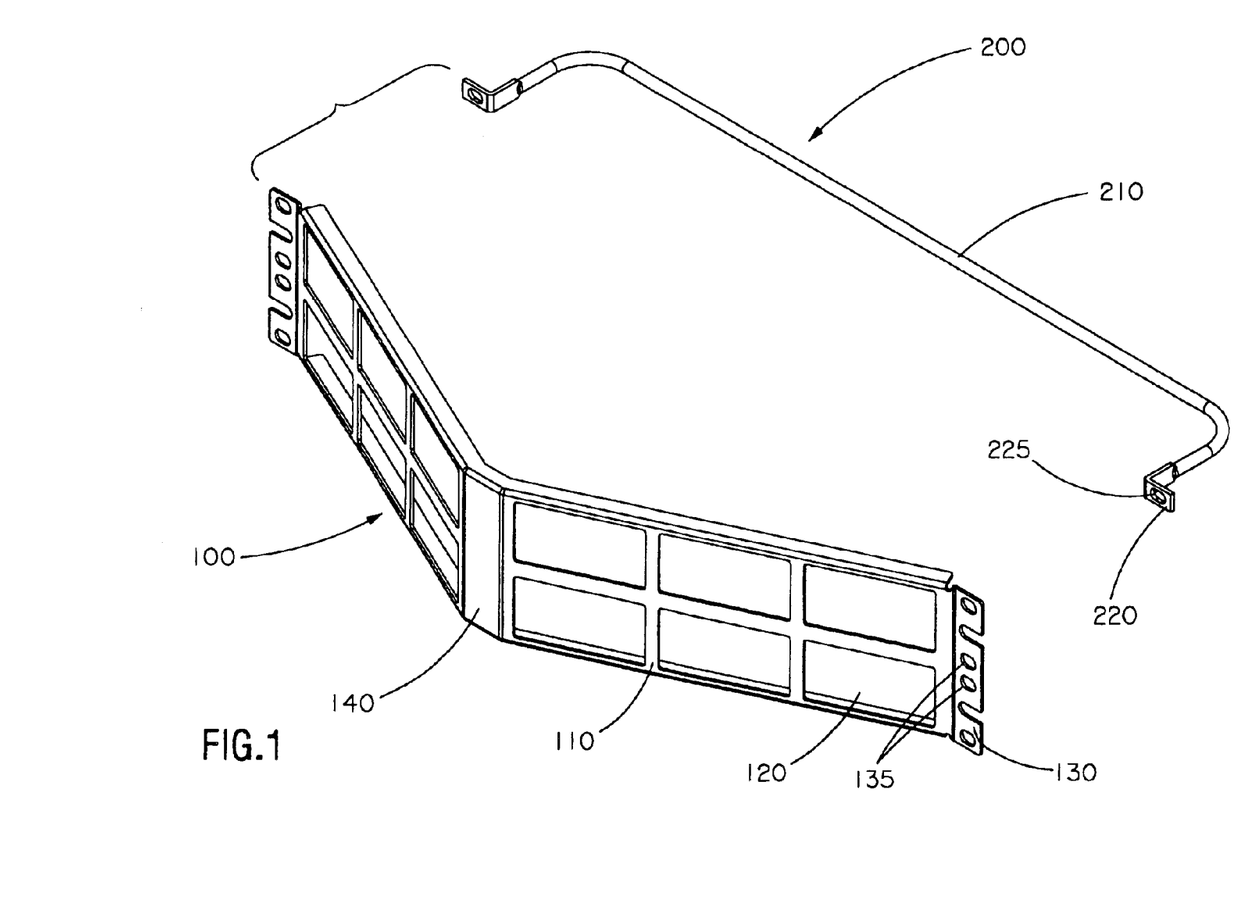
FIG. 1 shows an exploded isometric view of a first embodiment of an angled patch panel frame according to the present invention and a cable support bar therefor.

The patch panel frame 100 includes an outwardly angled central frame 110, a plurality of faceplate openings 120 and a mounting plate 130 at each end with a plurality of mounting apertures 135, as shown in FIG. 1. A flat centerpiece 140 located midway along frame 110 may be provided to space the openings 120 on opposite halves of the central frame 110 from each other. This centerpiece 140 also slightly reduces the depth D of the patch panel by eliminating the angle at a central portion where no openings 120 are located. Patch panel frame 100 is preferably such as metal so as to be self grounding. However, frame 110 may be formed of any suitable rigid material, such as many plastics or composites. A separate or integral cable support bar 200 may be provided on a rear side of the patch panel. Cable support bar 200 includes a bar portion 210 and mounting plates 220.

Figure 2:
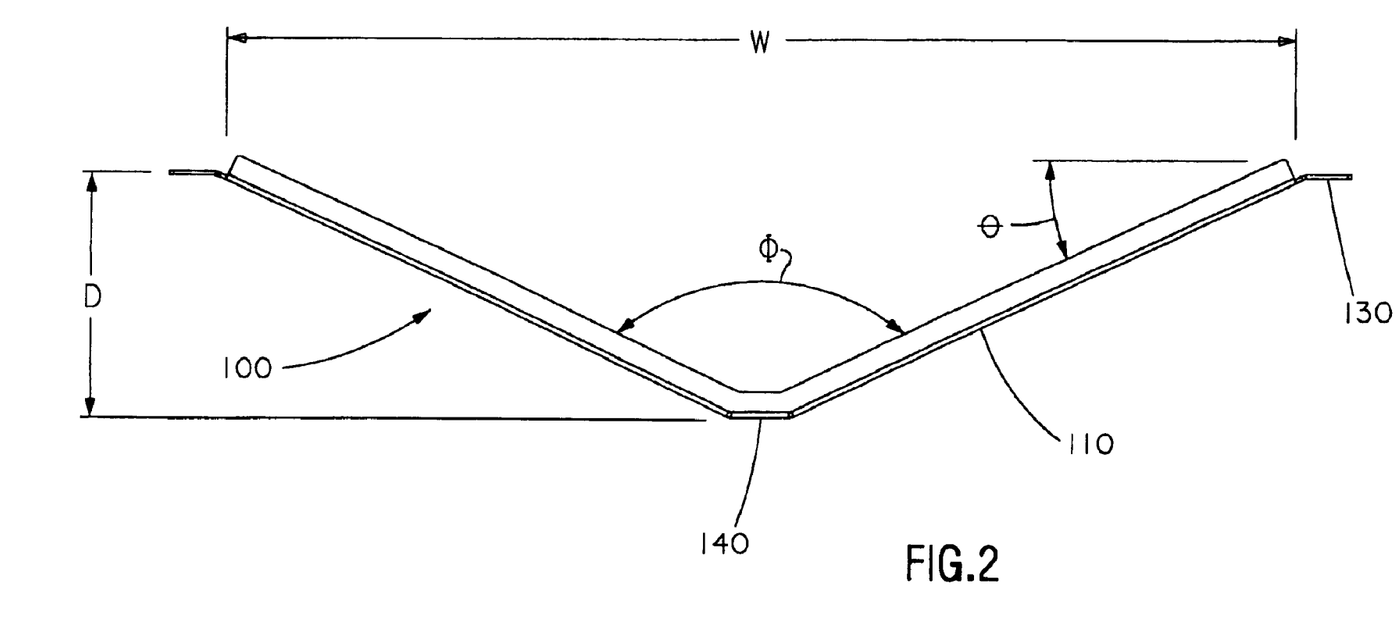
FIG. 2 shows a top view of the patch panel frame of FIG. 1.
Figure 6:
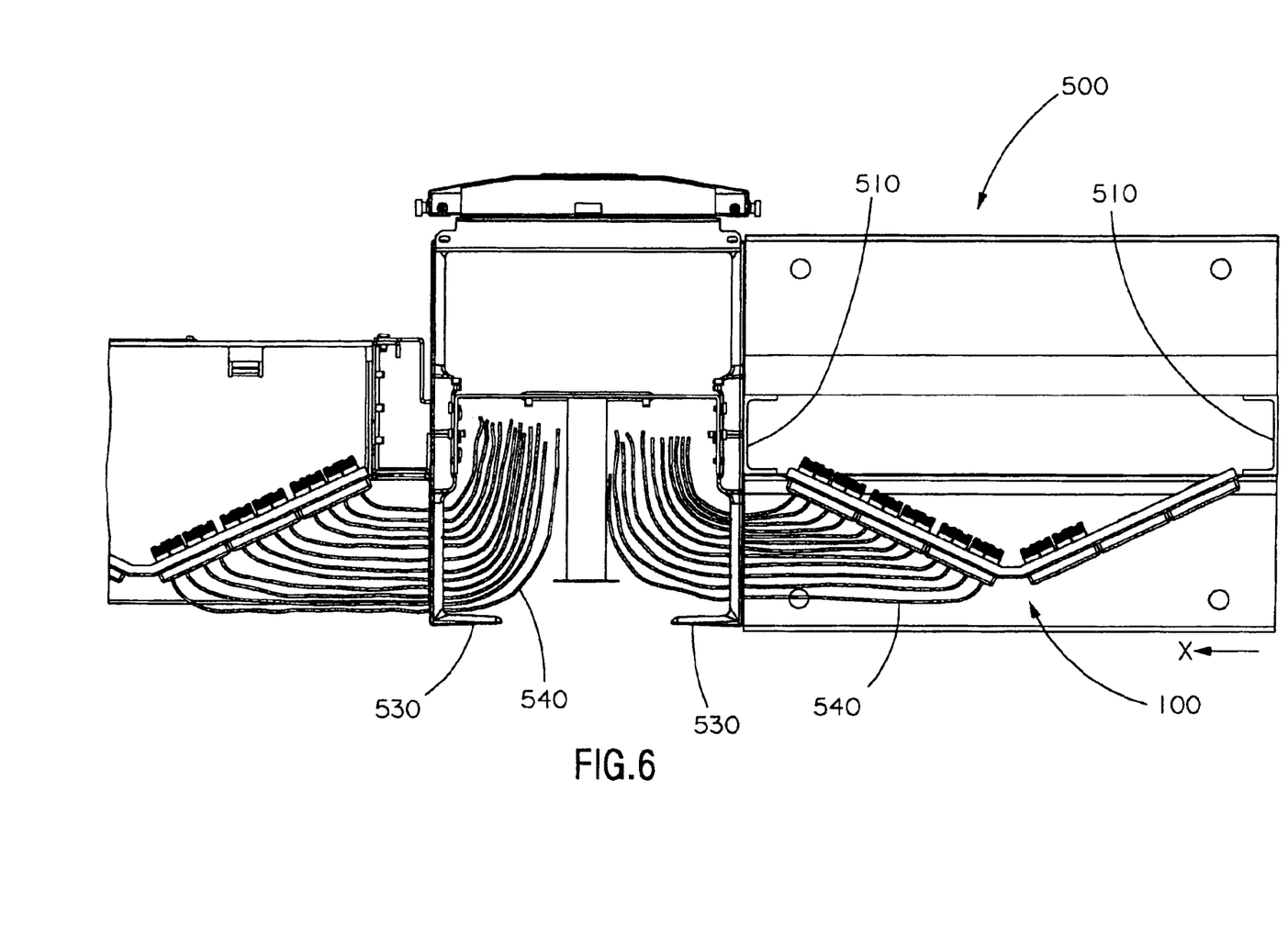
FIG. 6 shows a top view of the patch panel and the 19" standard rack of FIG. 4.

Both the patch panel frame 100 and cable support bar 200 are designed to mount on a rack. Patch panel frame 100 can be any size, but preferably is sized with a width W to fit within a conventional 19" or 23" EIA network rack that has spaced vertical rails or legs 510 that allow the mounting of various rack elements thereon (see FIGS. 4–5). The patch panel can occupy a single rack unit height of 1.75" (4.45 cm) or multiple rack unit height, such as the two rack unit height illustrated (3.5" or 8.9 cm). The rack 500 should have various mounting openings 520 or comparable devices to facilitate equipment mounting. When mounted, patch panel frame 100 protrudes out from the front of the rack 500 by a distance D of several inches, as shown in FIGS. 2 and 6, due to the outwardly angled frame 110.

The invention is not limited to such EIA racks, but is equally applicable to other known or subsequently developed racks. Moreover, a network rack 500 need not be an open frame structure as in the above EIA racks, but may include mounting cabinets or enclosures having mounting features and walls defining openings that can receive and affix rack elements, such as the patch panel 100, cable managers and the like.

Patch panel frame 100 is angled outwardly in a generally inverted V-shape. FIG. 2 shows a top view of the angled patch panel frame 100. Each half of the central frame 110 is preferably a mirror image and angled from the other by an angle φ, which is an obtuse angle of a suitable angle of between about 90° and 180°, preferably an angle of between about 100° to 140°, and more preferably between about 110° and 130°. The illustrative embodiment shown has an angle φ of about 120°. This allows cables attached to the front of the patch panel to flow directly to one or more vertical cable managers located adjacent the network rack.

The patch panel frame halves are also angled relative to mounting brackets 130 (which are oriented in line with each other and parallel to the front sides of rails 510 of the mounting rack 500) at an angle of θ,° which is an acute angle of preferably not more than 45°, preferably between about 20° to 40° degrees, and more preferably between about 25° and 35°. In the illustrative example, the angle θ is about 30°. While the central section is shown and described as being symmetrical, it is to be understood that the patch panel sections 110 could be disposed at different angles relative to the brackets 130 and thus be of different lengths.

Figure 3:
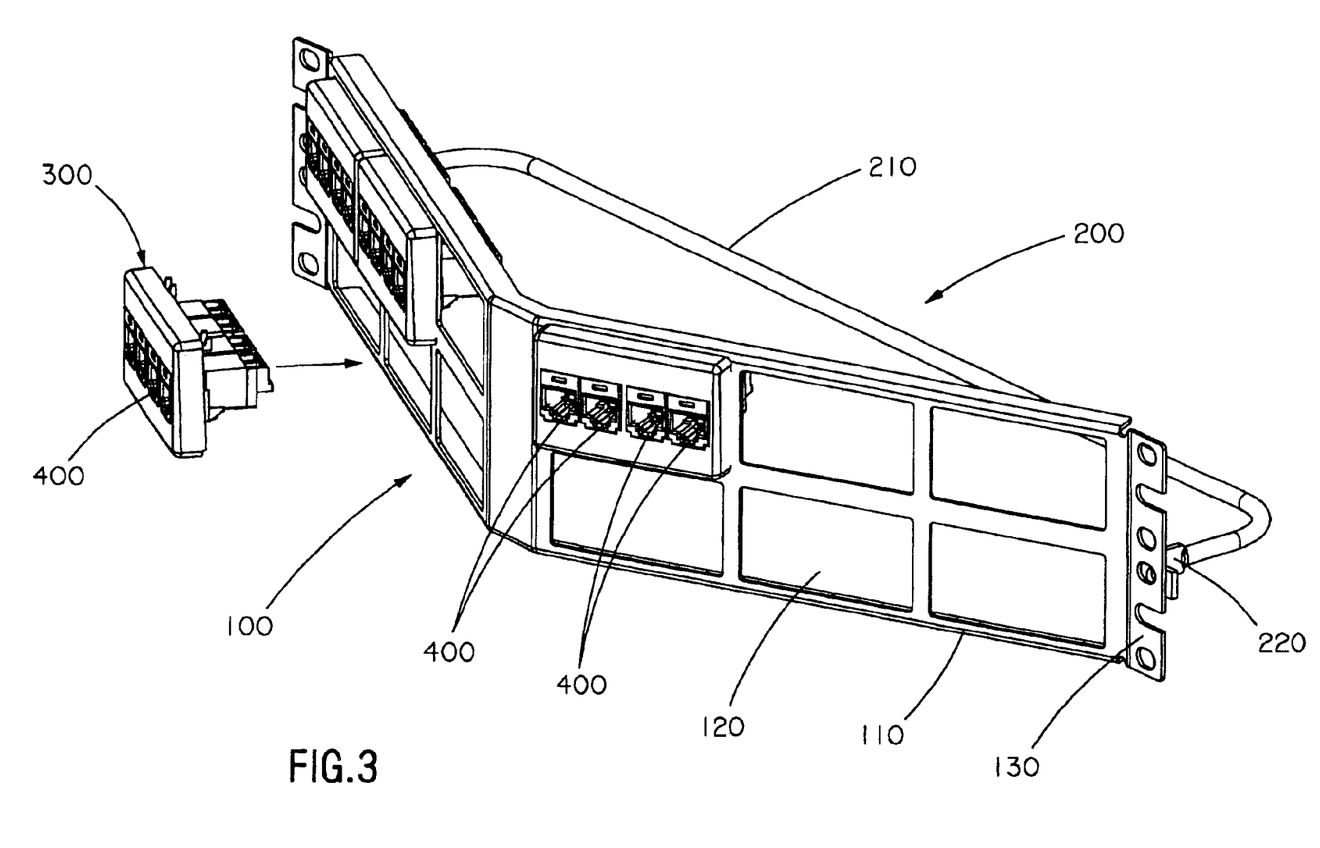
FIG. 3 shows an exploded view of an insert module loaded with four cable connector modules being inserted into the patch panel frame of FIG. 1.
Figure 4:
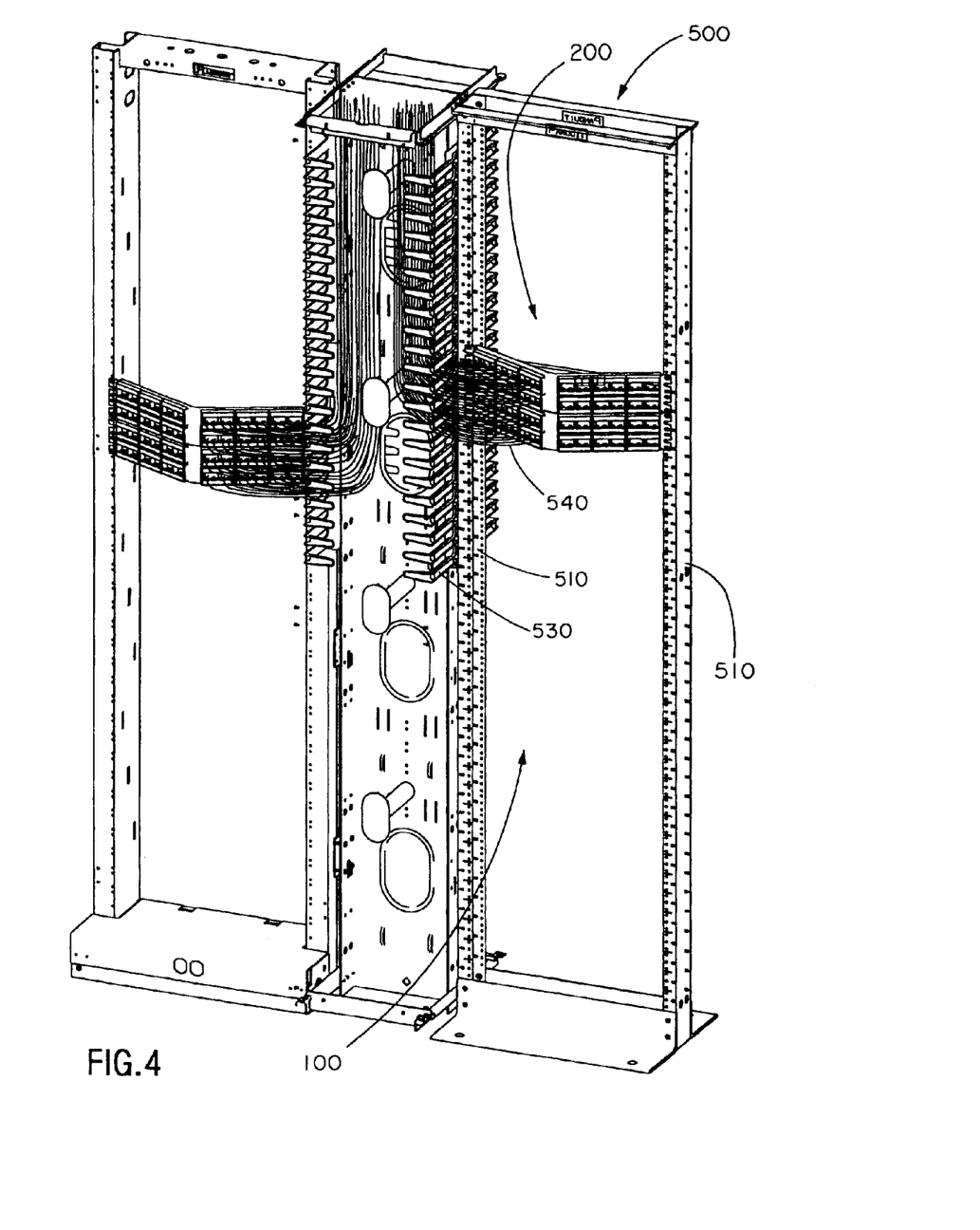
FIG. 4 shows the patch panel of FIG. 3 and the cable support bar mounted onto a 19" standard rack.
Figure 5:
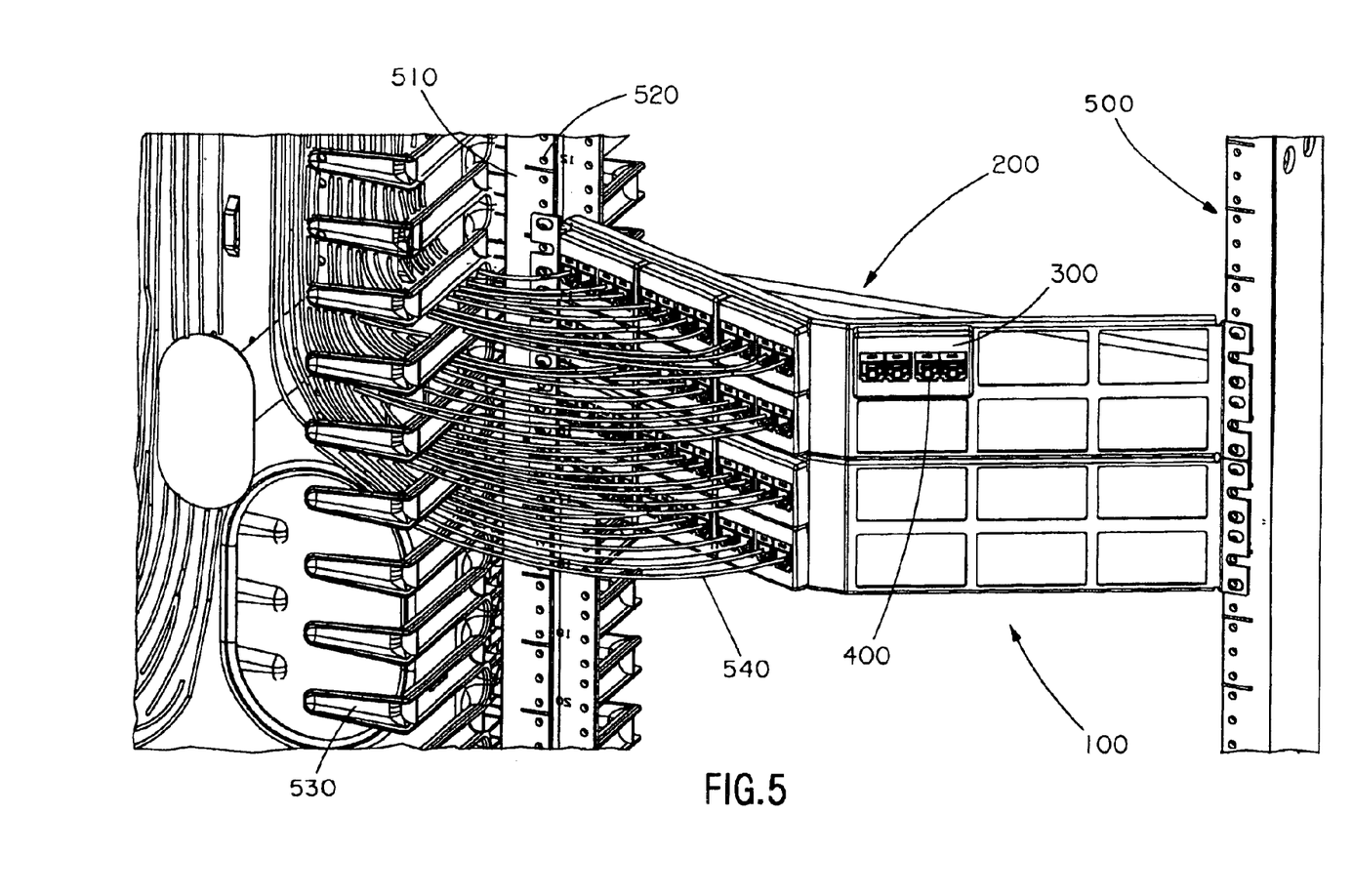
FIG. 5 is a detailed partial view of the 19" standard rack and patch panel of FIG. 4.

Patch panel frame 100 has a plurality of faceplate openings 120 that receive insert modules 300, as shown in FIG. 3. The insert modules 300 are sized to fit within openings 120, preferably by snap fit. However, rather than replaceable modules, modules 300 may be integrated into frame 110. The modules and openings may be multiple rack unit heights or may be sized as a single rack unit height, as shown. In the first illustrative exemplary embodiment, patch panel frame 100 has twelve faceplate openings 120. These twelve faceplate openings 120 allow twelve insert modules 300 to be inserted into the patch panel frame 100, as shown in FIG. 3.

Insert modules 300 are fitted to hold one or more removable cable connector modules 400. Cable connector modules 400 may take many forms, such as electrical, optical, telecommunications-related or other known or subsequently developed connector for connecting cabling. Preferred modules are capable of connecting UTP, ScTP, coaxial and/or fiber optic cables used in the telecommunications industry to transmit data, voice video and/or audio information.

Insert modules 300 are secured within patch panel openings 120 by way of snap fit, as is known in the art. FIG. 3 shows an exploded view of an insert module 300 loaded with four cable connector modules 400 that is then inserted into patch panel 100. Three other insert modules 300 with cable connector modules 400 are already loaded into patch panel 100. In this first illustrative example of FIGS. 1–6, patch panel 100 can have a total of twelve insert modules 300, each with a capacity of four connector modules 400 for a total capacity of 48 ports in a two rack unit space.

There are several advantages to the inventive patch panel. By making the frame angled outwardly in an inverted V-shape, the axis of each cable connector is at the acute angle θ relative to a common central axis (parallel to the depth direction D). This provides front connector surfaces that are better oriented relative to front corners of the rack rails 510, where vertical cable managers or ducts 530 are provided that contain cables 540 that mate with front sides of various ones of the cable connector modules 400 as shown in FIG. 6. In particular, the angled frame 110 provides a connector surface that is at a reduced angle relative to an exit direction of the cables exiting the vertical cable manager as compared to conventional patch panels. That is, prior art, flat-faced patch panels which were oriented substantially parallel to the exit direction and required one or more 90° cable bends for connection. In general practice, this required an external horizontal cable manager to control the bends and provide a minimum bend radius. However, as the inventive patch panel has surfaces that intersect this exit direction (direction X in FIG. 6) at an acute angle, the bend necessary to achieve connection is substantially less than 90° as shown. This reduces or eliminates the need for additional horizontal cable management adjacent to the patch panel to guide exiting cables from the vertical cable managers 530 to the individual connector modules 400 as each cable 540 is routed directly from each connector module 400 to the adjacent vertical duct 530.

Additionally, this structure results in slightly shorter patch cable lengths than before. Moreover, the outwardly angled frame 110 provides increased space behind patch panel frame 100 for housing the cabling. That is, as shown in FIG. 6, a conventional flat-faced patch panel would be flush to the rack rails 510 and would thus only provide an area of the inner rectangle between rails 510. However, with the angled patch panel, the receiving area is this inner rectangle plus the triangular area defined by the outwardly extending frame of patch panel 100.

Further, by making the front face of the patch panel angled (in an inverted V-shape), rather than flat, there is additional surface area on the front face of the patch panel. That is, for a rack of a given width, such as 19", a conventional flat patch panel would only have a surface area equal to 19"×N×1.75", where N is the number of rack units in height. However, at any given angle θ, the total length of the two angled halves of frame 110 will be greater than the length of a corresponding flat piece. For example, with the inventive angled path patch panel front face at an exemplary angle θ of 30°, the surface area is approximately 22"×N×1.75". This and other surface areas for other angles 6 can be simply solved using basic trigonometric principles.

The aforementioned features work together to increase the functionality of the inventive patch panel. That is, the increased space behind the patch panel helps accommodate the cabling needs, and the uniformly angled connector modules better manage the cabling on the front side of the patch panel by reducing the necessary bend angle for incoming cabling, eliminating the need for external horizontal cable managers as often required with conventional patch panels.

While horizontal cable management on the front side may not be necessary, it may be beneficial to provide cable support bar 200 to assist in supporting the weight of the various cabling attached to rear side of patch panel 100, and to assist in the direction of the cables exiting patch panel 100. Cable support bar 200 is preferably formed of a suitable material, such as metal. Support bar portion 210 preferably extends the entire width of rack 500 and includes mounting plates 220 each with at least one mounting aperture 225 as shown to mount the support bar on rack 500 or comparable device.

Cable support bar 200 is preferably separate from patch panel frame 100, but may be integrally formed therewith if desired. Cable support bar 200 may be attached to rack 500 using mounting apertures 225 either from the front when the patch panel frame 100 is attached, or from the back after the patch panel frame 100 has been attached. Attaching the cable support bar 200 from the back allows the end user to install the cable support bar 200 after all of the connectors have been terminated, thus eliminating any interference from the cable support bar 200 when terminating the connectors.

Figures 7, 8:
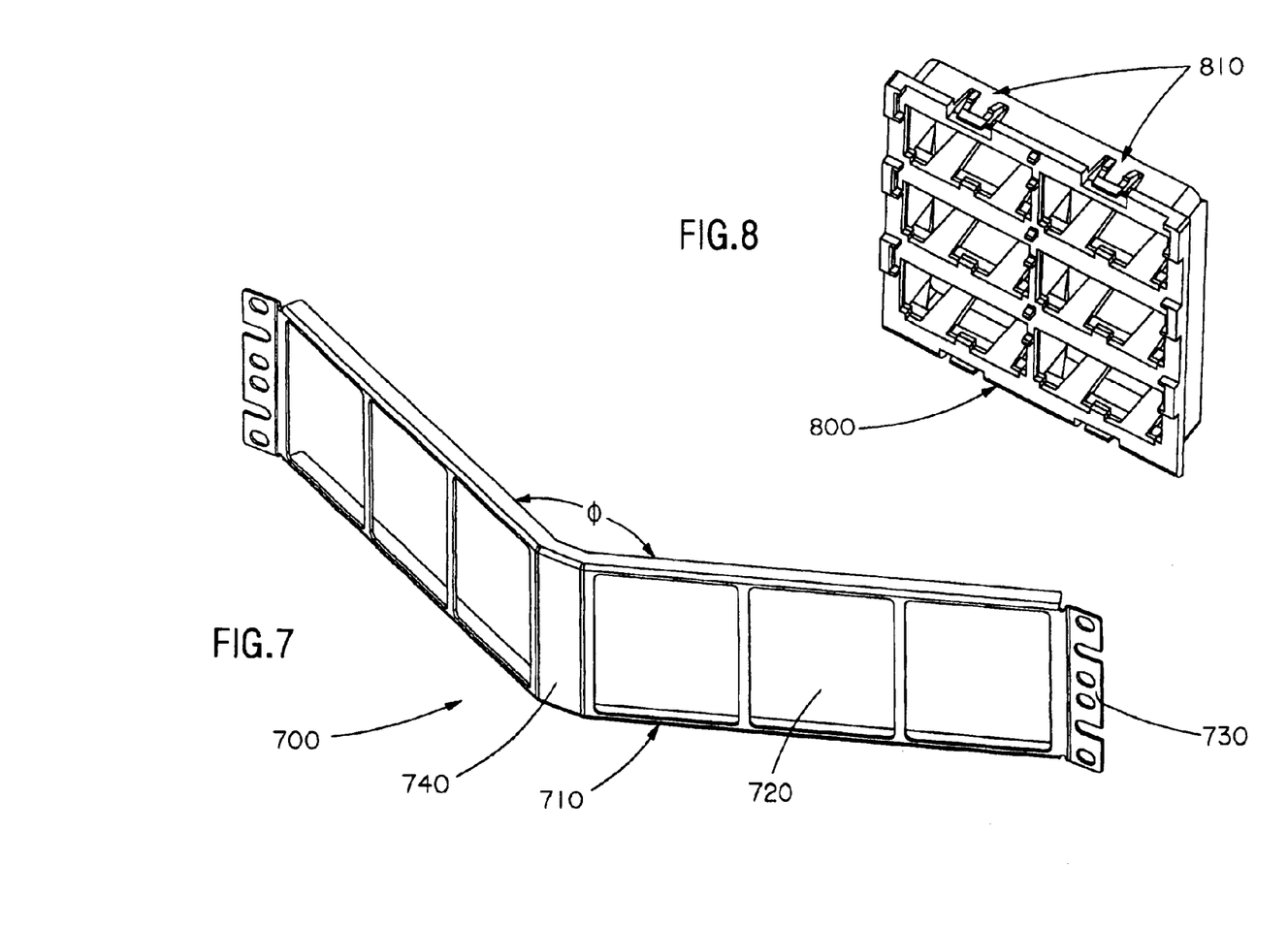
FIG. 7 show an isometric view of a second embodiment of an angled patch panel frame according to the present invention.
FIG. 8 shows an insert module used in the second embodiment of the patch panel.
Figure 9:
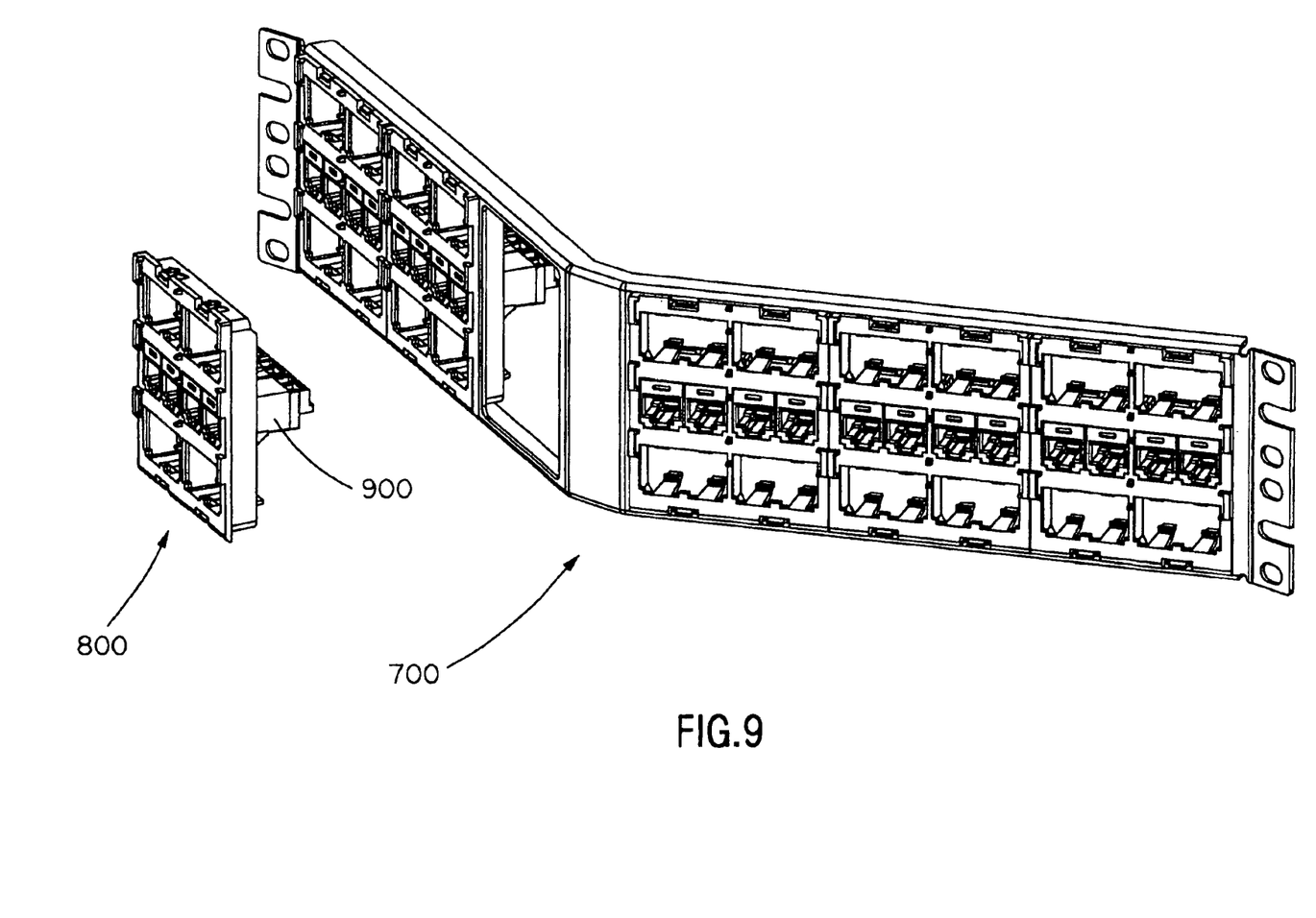
FIG. 9 shows an exploded view of an insert module loaded with four cable connector modules being loaded into the second embodiment of the patch panel.

In a second embodiment of the present invention shown in FIGS. 7–9, a variation in configuration is provided. Patch panel frame 700 is angled with angles φ and θ as in the first illustrative embodiment. However, for this embodiment, there are only six faceplate openings 720 in frame 710 that allow for twelve-pack insert modules 800 to be inserted therein. These modules occupy a double rack height. Like the previous embodiment, mounting plates 730 are provided for mounting the patch panel to a rack and a flat centerpiece 740 may be provided.

The twelve-pack insert modules 800 for the second embodiment of the present invention are shown in FIG. 8. While more or less connector modules could be provided, the illustrative insert modules 800 are capable of receiving up to twelve single-spaced cable connector modules 900. To allow a snap fit within openings 720, insert modules 800 have four 'upside down' snaps 810, as shown in FIG. 8, which hold insert module 800 to patch panel frame 700. However, other methods of affixing insert modules 800 to openings 720 are contemplated.

FIG. 9 shows an exploded view of an insert module 800 loaded with four exemplary cable connector modules 900 being positioned for mounting into patch panel frame 700. Five other insert modules 800 with cable connector modules 900 are shown already loaded into patch panel 700. While not necessary, the illustrative patch panel 700 covers two rack units as in the previous embodiment and fits into a standard 19" network rack. With this configuration, a capacity of 72 cable connector ports can be achieved in a two rack height patch panel.

As in the previous embodiment, frame 710 is angled outwardly in an inverted V-shaped so that the rear of all of the ports are angled toward a common central axis. This provides better flow of the cabling entering the front of patch panel 700 as described with respect to the first embodiment to eliminate the need for a front external horizontal cable manager. However, as in the first embodiment, a cable support bar 200 may be provided to support the weight of exiting cables to the rear of patch panel 700.

While the invention has been shown and described in conjunction with specific exemplary embodiments, the invention is not limited to these. It will be obvious to those skilled in the art that changes and modifications may be made without departing from the teachings of this invention and that the matter set forth in the foregoing description and accompanying drawings is offered by way of illustration only and not as a limitation. The actual scope of the invention is intended to be defined in the following appended claims.

What is claimed is:

1. A patch panel mountable to a network rack, comprising:

a frame having rack mounting plates provided on opposite longitudinal ends of the frame, wherein the frame includes a first panel section, a second panel section angled relative thereto and a centerpiece connecting the first and second panel sections, each of the first and second panel sections having mountable thereon a first connector adjacent the centerpiece and a second connector adjacent a rack mounting plate, the second connector being closer than the first connector to a horizontal axis extending between the rack mounting plates.

2. The patch panel of claim 1, wherein the first and second panel sections are angled outwardly in a V-shape.

3. The patch panel of claim 1 wherein the first and second panel sections are symmetrical.

4. The patch panel of claim 1 wherein the centerpiece has no connectors mounted therein.

5. The patch panel of claim 1 wherein the centerpiece is substantially flat.

* * * * *

UNITED STATES PATENT AND TRADEMARK OFFICE
CERTIFICATE OF CORRECTION

PATENT NO.    : 6,918,786 B2
DATED         : July 19, 2005
INVENTOR(S)   : Jed M. Barker et al.

It is certified that error appears in the above-identified patent and that said Letters Patent is hereby corrected as shown below:

<u>Title page,</u>
Item [57], ABSTRACT,
Line 4, the word "rack" is omitted after "network.".

<u>Column 1,</u>
Line 21, "and" should be omitted after "enclosure."
Line 23, "natch" should read -- patch --.
Line 35, "formed" is missing after "usually.".
Line 40, "a" is omitted after "and" at the end of the line.
Line 57, "necessities" should read -- necessity --.
Line 60, "accomodate" should read -- accommodate --.
Line 64, "and" should read -- an -- after "provide.".

<u>Column 2,</u>
Line 6, "one" should read -- ones --.
Line 30, "and" should read -- an -- after "in" at the end of the line.
Line 31, "V-shaped" should read -- V-shape --.
Line 60, "show" should read -- shows --.

<u>Column 3,</u>
Line 17, "formed of a suitable material," is missing after "preferably."

<u>Column 5,</u>
Line 8, "path" should be omitted after "angled."
Line 10, "6" should be -- θ -- after "angles."
Line 13, "72" should not be bold.
Line 24, "the" is missing after "to."

UNITED STATES PATENT AND TRADEMARK OFFICE
CERTIFICATE OF CORRECTION

PATENT NO. : 6,918,786 B2
DATED : July 19, 2005
INVENTOR(S) : Jed M. Barker et al.

It is certified that error appears in the above-identified patent and that said Letters Patent is hereby corrected as shown below:

Column 6,
Line 17, "V-shaped" should read -- V-shape --.
Lines 51, 53 and 55, there is a "comma" missing after "1."

Signed and Sealed this

Thirteenth Day of September, 2005

JON W. DUDAS
*Director of the United States Patent and Trademark Office*